United States Patent Office
3,832,332
Patented Aug. 27, 1974

3,832,332
POLYAMIDE POLYMER OF DIAMINO METHYL ADAMANTANE AND DICARBOXYLIC ACID
Robert M. Thompson, Wilmington, Del., assignor to Sun Research and Development Co., Philadelphia, Pa.
No Drawing. Filed Oct. 22, 1971, Ser. No. 191,833
Int. Cl. C08g 20/20
U.S. Cl. 260—78 R                    13 Claims

ABSTRACT OF THE DISCLOSURE

A novel polyamide polymer is prepared by the condensation of an alkyladamantane diamine of the structure:

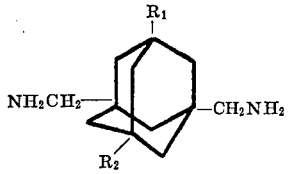

wherein each of $R_1$ and $R_2$ is an alkyl radical having 1–10 carbon atoms and a dicarboxylic acid having the following structure, HOOC—$(R)_n$—COOH wherein R is one of the following: —$CH_2$— with $n=2$–12 or a cyclic radical with $n=1$. The polymer is useful in forming films, transparent molded articles, sheets and fibers and other similar thermoplastic products.

CROSS-REFERENCE TO RELATED APPLICATIONS

This invention is related to those described and claimed in applicant's applications Ser. Nos. 191,706, abandoned Nov. 20, 1972, 191,826, 191,827, and 191,700 all filed the same date as this application. The first of the aforementioned applications relates to the preparation of an alkyladamantane diamine from an alkyladamantane diacid; the second to the preparation of an alkyladamantane dinitrile from an alkyladamantane diacid; the third to a novel polyimide polymer prepared from alkyladamantane diamine, and the fourth to a method for preparing a water white polyimide polymer from an alkyladamantane diamine.

BACKGROUND OF THE INVENTION

Preparation of an alkyladamantane diamine of the structure:

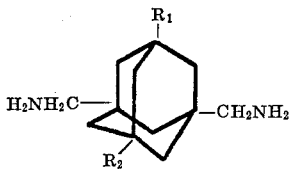

wherein each of $R_1$ and $R_2$ is an alkyl radical having 1–10 carbon atoms from its alkyladamantane diacid is shown in the copending application Ser. No. 191,826, filed same date by the same inventor.

Preparation of an alkyladamantane diacid, the precursor of an alkyladamantane diamine, is described in U.S. Pat. No. 3,356,719, issued Dec. 5, 1967, A Schneider et al.

Preparation of dicarboxylic acid having the following structure, HOOC—$(R)_n$—COOH where R is one of the following: —$CH_2$— with $n=2$–12 or a cyclic radical with $n=1$ is shown in Encyclopedia of Chemical Technology, Kirk-Othrmer, 2nd Edition, Vol. 1, starting page 240, Acids, Dicarboxylic.

Generally, a condensation polymer is one derived from two monomeric starting materials and is formed by the elimination of water or the equivalent. Thus, as used herein, the term condensation polymer refers to the diamine (A) and the diacid (B) condensing to form the novel polyamide having the repeating unit —AB—.

SUMMARY OF THE INVENTION

The present invention relates to a novel polyamide polymer. More particularly, the invention relates to a polymer produced from an alkyladamantane diamine and dicarboxylic acid, such as sebacic acid, via condensation. Also, present invention relates to articles prepared from the polyamide polymer.

DESCRIPTION OF THE INVENTION

The polyamide polymer of the present invention can be described as polymer prepared in part from an alkyladamantane diamine of the following structure:

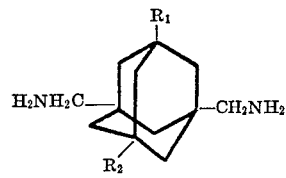

wherein $R_1$ and $R_2$ each is an alkyl radical having 1–10 carbon atoms. Preferably diamines are those where $R_1$ and $R_2$ each is a methyl and/or ethyl radical.

The other reactant used to prepare the polymer of present invention is a dicarboxylic acid having the following structure, HOOC—$(R)_n$—COOH where R is one of the following: —$CH_2$— with $n=2$–12 or a cyclic radical with $n=1$. Thus examples of a specific aliphatic dicarboxylic acid are succinic, glutaric, adipic, pimelic, suberic, azelaic, sebacic, undecanedioic, dodecanedioic, tridecanedioic and tetradecanedioic. Preferable dicarboxylic acids are ones with $n=6$–10. The cyclic radical can contain 5, 6, 8 or 10 carbon atoms. Preferable cyclic radicals are arylene radicals, e.g. phenylene, naphthylene, or ring-substituted derivatives thereof. Some examples of cyclic diacids are phthalic, isophthalic, terephthalic, 2,6-naphthalenedicarboxylic, and 1,5-naphthalenedicarboxylic.

Thus the two reactants form a polyamide polymer consisting essentially of repeating units of the following structural unit:

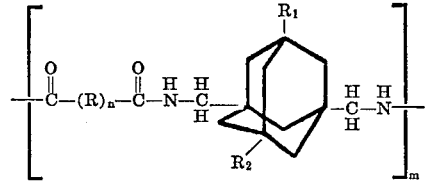

wherein $m$ is an integer of from 5–500; preferably 10–300.

The polymers of the present invention preferably have inherent viscosities in the range of .05 to 5.0. The inherent viscosity ($\eta_{inh.}$) is indicative of the degree of polymerization and is used herein as a measure thereof. Inherent viscosity is represented by the equation:

$$\eta_{inherent} = \ln \frac{\eta_{relative}}{C}$$

where $\eta_{relative} = t/t_o$
$t_o$ = flow time through a viscometer of a liquid reference
$t$ = flow time through the same viscometer of a dilute solution of polymer in the reference liquid
$C$ = concentration of polymer in solution expressed in grams/deciliter.

Inherent viscosities ($\eta_{inh.}$) unless otherwise specified is determined in the instant specification and claims by a 0.5% solution of polymer in m-cresol and are measured at 37.8° C.

The molecular weight of the polymer depends on the number of repeating units; i.e., the number of diamine-carboxylic acid units that occur repeatedly in the resulting molecule. The molecular weight of the polymer is preferably as low as 2,000 or as high as 75,000; however, a particularly suitable polymer is one having a molecular weight in the range of about 10,000–60,000; more suitably 20,000–50,000.

Three methods can be employed to prepare the polyamide. These are interfacial condensation, melt condensation and solution condensation. These methods are described in detail in U.S. Pat. 3,464,957, Sept. 2, 1969, G. L. Driscoll. While all three methods produce satisfactory polymers, the melt condensation is preferred. The latter is also known as "nylon salt" condensation.

The "melt" method is described in detail in the example hereinafter. Certain ratios of reactants and certain reaction conditions have been spcified in the example. It will be understood, of course, that the reaction variables are more or less interdependent and that when one is arbitrarily fixed the limits within which the others may be varied are somewhat restricted. The more desirable ranges and relationships can be ascertained from the example presented hereinafter. For any particular application of the invention, the most desirable conditions can be readily determined by trial by one skilled in the art, such a determination being facilitated by the trends of these variables presented in the example.

Examples of articles that can be prepared from the polyamide polymer defined herein include films, fibers, transparent molded articles and others which are described in *Modern Plastics Encyclopedia*, 1970/1971. These articles comprise, in addition to the polyamide itself, the usual additives such as antioxidants, antistatic agents, colorants, plasticizers, flame retardants, bulk fillers, stabilizers, and ultraviolet absorbers. Methods used to process the polyamide polymer, with or without additives, into a desired form include extrusion, injection molding, casting, and others described in the aforementioned encyclopedia.

EXAMPLE

Ten grams of sebacic acid and 9.1 grams of 1,3-di(aminomethyl)-5,7-dimethyladamantane were dissolved in 120 milliliters of anhydrous ethanol. After standing for 3 hours, 40 milliliters of ether were added to the enthanol mixture to precipitate the salt. The precipitate was filtered from the ethanol-ether mixture and washed with cold ethanol and afterwards dried in a vacuum. Fourteen grams were obtained. A water solution of the salt had a pH of 6.6

Some of the aforementioned salt was placed in a heavy walled glass polymerization tube under high vacuum. Care was taken to insure complete absence of oxygen. The tube was sealed. It was then placed in a metal bath maintained at 220° C. and kept in the bath for 1½ hours. Afterwards the tube was cooled to room temperature and the prepolymer was removed. The prepolymer was crushed and placed in a test tube, which was hooked up to an on-off vacuum system, along with a drop of water. The water converted to steam during heating and helped purge out any air in the tube. Also, the tube was purged with nitrogen to remove any oxygen. The tube was placed in a bath maintained at a temperature of 250° C. Shortly thereafter the temperature was increased to 270° C. and the tube kept in the bath for 3 hours. After the 3 hours elapsed, a vacuum was applied to the tube which facilitated the removal of the final traces of reaction water. Within an hour, no further bubbling was observed within the tube. The vacuum was shut off, the tube filled with nitrogen, and the bath removed. After the temperature of the tube reached ambient temperature, the polymer was removed.

The polymer was a clear, transparent material with a melting point of 160° C. Its inherent viscosity in m-cresol was 0.61.

The use of other dicarboxylic acids and mixtures of acids such as succinic, glutaric, adipic, pimelic, suberic, azelaic, undecanedioic, dodecanedioic, phthalic, isophthalic, terephthalic, 2,6 - naphthalenedicarboxylic, and 1,5-naphthalenedicarboxylic, etc., will yield analogous copolymers. Also, use of other adamantane diamines such as 1,3 - di(aminomethyl) - 5 methyl, 7 ethyl adamantane, 1,3 - di(aminomethyl) - 5 ethyl, 7-propyl adamantane, etc., also will yield analogous polymers.

The invention claimed is:

1. A solid polyamide polymer consisting essentially of repeating units of the following structural unit:

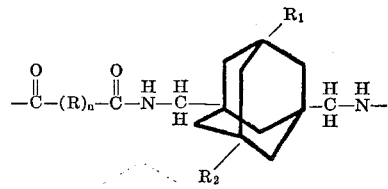

in which R is a —$CH_2$— with $n=2$–12 and $R_1$ and $R_2$ each is an alkyl radical having 1–10 carbon atoms.

2. A polymer according to Claim 1 wherein the inherent viscosity is .05 to 5.0 as determined by a 0.5% solution of polymer in m-cresol and measured at 37.8° C.

3. A polymer according to Claim 1 wherein $n=3$–8.

4. A polymer according to Claim 1 wherein $R_1$ and $R_2$ are methyl radicals.

5. A polymer according to Claim 4 wherein R is —$CH_2$— with $n=8$.

6. A polymer according to Claim 5 wherein the melting point is about 160° C.

7. A polymer according to Claim 6 wherein the inherent viscosity is about 0.6 as determined by a 0.5% solution of polymer in m-cresol and measured at 37.8° C.

8. A solid polyamide polymer consisting essentially of repeating units of the following structural unit:

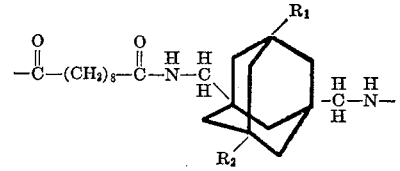

in which each of $R_1$ and $R_2$ is an alkyl radical having 1–10 carbon atoms.

9. A solid polyamide polymer consisting essentially of repeating units of the following structural unit:

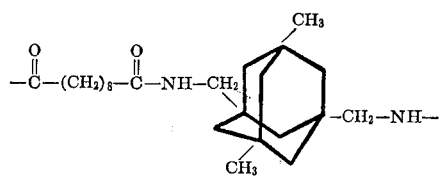

and wherein the molecular weight is about 20,000 as determined by a 0.5% solution of polymer in m-cresol and measured at 37.8° C.

10. A film consisting essentially of a solid polymer of repeating units of the following structural unit:

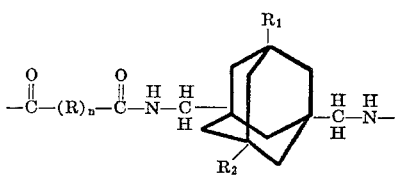

in which R is a —$CH_2$— with $n=2$–12 and $R_1$ and $R_2$ each is an alkyl radical having 1–10 carbon atoms.

11. Film according to Claim 10 wherein R is —$CH_2$— with $n=6$–8 and each of $R_1$ and $R_2$ is a methyl radical.

12. A fiber consisting essentially of a solid polymer of repeating units of the following structural unit:

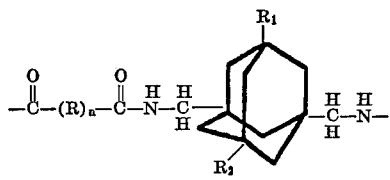

in which R is a —$CH_2$— with $n=2-12$ and $R_1$ and $R_2$ each is an alkyl radical having 1–10 carbon atoms.

13. Fiber according to Claim 12 wherein R is —$CH_2$— with $n=6-8$ and each of $R_1$ and $R_2$ is a methyl radical.

References Cited

UNITED STATES PATENTS

| 3,301,827 | 1/1967 | Martin | 260—78 R |
| 3,053,907 | 9/1962 | Smith et al. | 260—78 R |
| 3,464,957 | 9/1969 | Driscoll | 260—78 R |

OTHER REFERENCES

Kirk-Othmer, Encyclopedia of Chemical Technology, 2nd edition, 1967, pp. 6, 7, 20, 21, 22, 27.

HAROLD D. ANDERSON, Primary Examiner

U.S. Cl. X.R.

260—33.4 R, 563 P